United States Patent
Nakadori (10) Patent No.: US 10,137,894 B2
(45) Date of Patent: Nov. 27, 2018

(54) DRIVING ASSISTANCE SYSTEM

(71) Applicant: TOYOTA JIDOSHA KABUSHIKI KAISHA, Toyota-shi, Aichi-ken (JP)

(72) Inventor: Minoru Nakadori, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 132 days.

(21) Appl. No.: 15/447,978

(22) Filed: Mar. 2, 2017

(65) Prior Publication Data

US 2017/0259821 A1 Sep. 14, 2017

(30) Foreign Application Priority Data

Mar. 8, 2016 (JP) .................. 2016-044078

(51) Int. Cl.
| | |
|---|---|
| *B60W 40/04* | (2006.01) |
| *B60W 40/09* | (2012.01) |
| *B60W 30/165* | (2012.01) |
| *B60W 30/17* | (2012.01) |
| *B60W 50/14* | (2012.01) |
| *B60W 30/18* | (2012.01) |
| *B60W 30/14* | (2006.01) |

(52) U.S. Cl.
CPC ...... *B60W 30/17* (2013.01); *B60W 30/18027* (2013.01); *B60W 40/04* (2013.01); *B60W 50/14* (2013.01); *B60W 30/14* (2013.01); *B60W 2420/52* (2013.01); *B60W 2540/10* (2013.01); *B60W 2550/10* (2013.01); *B60W 2550/302* (2013.01); *B60W 2550/308* (2013.01); *B60W 2720/10* (2013.01); *B60W 2750/308* (2013.01)

(58) Field of Classification Search
None
See application file for complete search history.

(56) References Cited

U.S. PATENT DOCUMENTS 6,389,332 B1   5/2002   Hess et al.
9,952,599 B2 *  4/2018   Kobayashi ........... G05D 1/0246
(Continued)

FOREIGN PATENT DOCUMENTS

JP   2000-357300 A   12/2000
JP   2002-104016 A   4/2002
(Continued)

*Primary Examiner* — Thomas G Black
*Assistant Examiner* — Demetra R Smith-Stewart
(74) *Attorney, Agent, or Firm* — Oliff PLC (57) ABSTRACT

A driving assistance system includes an electronic control unit and a notifying unit. The electronic control unit detects an inter-vehicle distance and relative velocity, controls the subject vehicle, performs a first notification operation when the inter-vehicle distance becomes equal to or larger than a first distance and the relative velocity becomes equal to or higher than a first velocity, or equal to or larger than a second distance, sets an inter-vehicle distance when the forward vehicle and the subject vehicle are stopped as a reference inter-vehicle distance and performs a second notification operation when a difference between the reference inter-vehicle distance and the inter-vehicle distance becomes equal to or larger than a third distance. The electronic control unit does not perform the second notification operation at least until after the first notification operation is performed.

6 Claims, 4 Drawing Sheets

(56) References Cited

U.S. PATENT DOCUMENTS

| | | | |
|---|---|---|---|
| 2007/0213915 A1* | 9/2007 | Tange | B60T 7/22 |
| | | | 701/96 |
| 2009/0164080 A1* | 6/2009 | Kurata | B60K 31/0008 |
| | | | 701/70 |
| 2015/0183441 A1* | 7/2015 | Aoki | B60W 40/09 |
| | | | 434/62 |
| 2017/0068248 A1* | 3/2017 | Kobayashi | G05D 1/0246 |

FOREIGN PATENT DOCUMENTS

| | | |
|---|---|---|
| JP | 2005-247143 A | 9/2005 |
| JP | 2013-123993 A | 6/2013 |

* cited by examiner

DRIVING ASSISTANCE SYSTEM

INCORPORATION BY REFERENCE

The disclosure of Japanese Patent Application No. 2016-044078 filed on Mar. 8, 2016 including the specification, drawings and abstract is incorporated herein by reference in its entirety.

BACKGROUND

1. Technical Field

The present disclosure relates to a driving assistance system.

2. Description of Related Art

A driving assistance system that performs inter-vehicle distance control (ACC: Adaptive Cruise Control) for controlling an inter-vehicle distance between a forward vehicle and a subject vehicle has been proposed. Under the ACC, when a forward vehicle that travels in front of the subject vehicle is detected, the subject vehicle follows the forward vehicle such that the inter-vehicle distance between the forward vehicle and the subject vehicle is controlled to an inter-vehicle distance appropriate to the speed of the subject vehicle. When no forward vehicle is detected, the subject vehicle is controlled so as to travel at a constant speed that is set by the driver. As one form of the ACC, full speed range ACC for controlling the inter-vehicle distance between the forward vehicle and the subject vehicle over the full vehicle speed range has been proposed (see, for example, Japanese Patent Application Publication No. 2013-123993 (JP 2013-123993 A)). When the forward vehicle stops, the full speed range ACC causes the subject vehicle to be stopped while keeping an appropriate inter-vehicle distance. When the forward vehicle resumes traveling, the full speed range ACC notifies or informs the driver of permission of starting (in other words, starting of the forward vehicle) via screen display, and resumes following traveling of the subject vehicle if the driver performs a starting operation.

Also, a driving assistance system that performs a forward vehicle start notifying function (LVN: Leading Vehicle movement Notice) of notifying the driver of starting of a forward vehicle has been proposed. When the driver continues to stop his/her own vehicle (subject vehicle) without noticing starting of the forward vehicle, such as when waiting at a traffic light, the system notifies the driver of starting of the forward vehicle, via sound and screen display.

SUMMARY

In the future, there is a possibility that the full speed range ACC and the LVN are used in the same vehicle. Since the full speed range ACC and the LVN employ different conditions based on which it is determined whether the driver should be notified of starting of the forward vehicle, notification under the full speed range ACC and notification under the LVN may be carried out at substantially the same time, in some situations. In this case, the driver may be annoyed or disturbed.

The present disclosure provides a technology that can deter notification that would annoy or disturb the driver, in a driving assistance system that can perform both inter-vehicle distance control over the full vehicle speed range, and a forward vehicle start notifying function.

An aspect of the present disclosure provides a driving assistance system. The driving assistance system according to the aspect of the present disclosure includes at least one electronic control unit and a notifying unit. The at least one electronic control unit is configured to detect an inter-vehicle distance between a forward vehicle and a subject vehicle, detect a relative velocity between the forward vehicle and the subject vehicle, control the subject vehicle such that the inter-vehicle distance becomes equal to a target inter-vehicle distance, determine that a notification condition is satisfied, when an inter-vehicle distance between a stopped subject vehicle and the forward vehicle becomes equal to or larger than a predetermined first distance and the relative velocity becomes equal to or higher than a predetermined first velocity, or the inter-vehicle distance between the stopped subject vehicle and the forward vehicle becomes equal to or larger than a predetermined second distance, the predetermined second distance being larger than the predetermined first distance, and perform a first notification operation on a driver when the notification condition is satisfied, set the inter-vehicle distance in a condition where both of the forward vehicle and the subject vehicle are stopped, as a reference inter-vehicle distance, and perform a second notification operation on the driver, when a difference between the reference inter-vehicle distance and the inter-vehicle distance, becomes equal to or larger than a predetermined third distance. The notifying unit is configured to perform notification on the driver when receiving a signal from the at least one electronic control unit. The at least one electronic control unit is configured not to perform the second notification operation on the driver, at least until after the first notification operation is performed, when the subject vehicle is controlled such that the inter-vehicle distance becomes equal to the target inter-vehicle distance.

With the above arrangement, the first notification operation on a driver, and the second notification operation on the driver, in connection with starting of the forward vehicle, are not performed at substantially the same time. Accordingly, notification that would annoy or disturb the driver can be deterred.

In the aspect of the present disclosure, the at least one electronic control unit may be configured to set the inter-vehicle distance at a given point in time upon or after a time at which it is determined that the notification condition is satisfied, as the reference inter-vehicle distance, when the subject vehicle is controlled such that the inter-vehicle distance becomes the target inter-vehicle distance.

In this case, after the first notification operation regarding starting of the forward vehicle is made, the second notification operation is made. Namely, the notifying actions are performed in a predetermined order, and notification that would annoy the driver can be deterred.

In the aspect of the present disclosure, the at least one electronic control unit may be configured to set the inter-vehicle distance at the time when it is determined that the notification condition is satisfied as the reference inter-vehicle distance, when the subject vehicle is controlled such that the inter-vehicle distance becomes the target inter-vehicle distance.

In the aspect of the present disclosure, the at least one electronic control unit may be configured to set the inter-vehicle distance at a time when the first notification operation is executed, as the reference inter-vehicle distance, when the subject vehicle is controlled such that the inter-vehicle distance becomes the target inter-vehicle distance.

In the aspect of the present disclosure, the at least one electronic control unit may be configured not to perform the second notification operation on the driver, when the subject vehicle is controlled such that the inter-vehicle distance becomes the target inter-vehicle distance.

In this case, no second notification operation regarding starting of the forward vehicle is made when the subject vehicle is controlled such that the inter-vehicle distance becomes the target inter-vehicle distance. Namely, the driver is not notified by the two means or units of starting of the forward vehicle, and is thus free from notification that would annoy the driver.

In the aspect of the present disclosure, the at least one electronic control unit may be configured to perform the first notification operation on the driver, when the inter-vehicle distance between the stopped subject vehicle and the forward vehicle becomes equal to or larger than the predetermined first distance, and the relative velocity becomes equal to or higher than the predetermined first velocity, or when the inter-vehicle distance between the stopped subject vehicle and the forward vehicle becomes equal to or larger than the predetermined second distance, when the subject vehicle is stopped in response to stop of the forward vehicle.

According to present disclosure, in the driving assistance system that can perform both inter-vehicle distance control and forward vehicle start notification control, it is possible to deter notification that would annoy the driver.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

The same reference numerals are assigned to the same or equivalent constituent elements or components illustrated in the drawings, and repeated explanation of these elements or components will be omitted when appropriate. Also, the dimensions of the components in the drawings are enlarged or contracted as needed for the sake of easy understanding. Also, some of the components, which are not important in explanation of embodiments of the present disclosure, are illustrated in simple form in the drawings.

Figure 1:
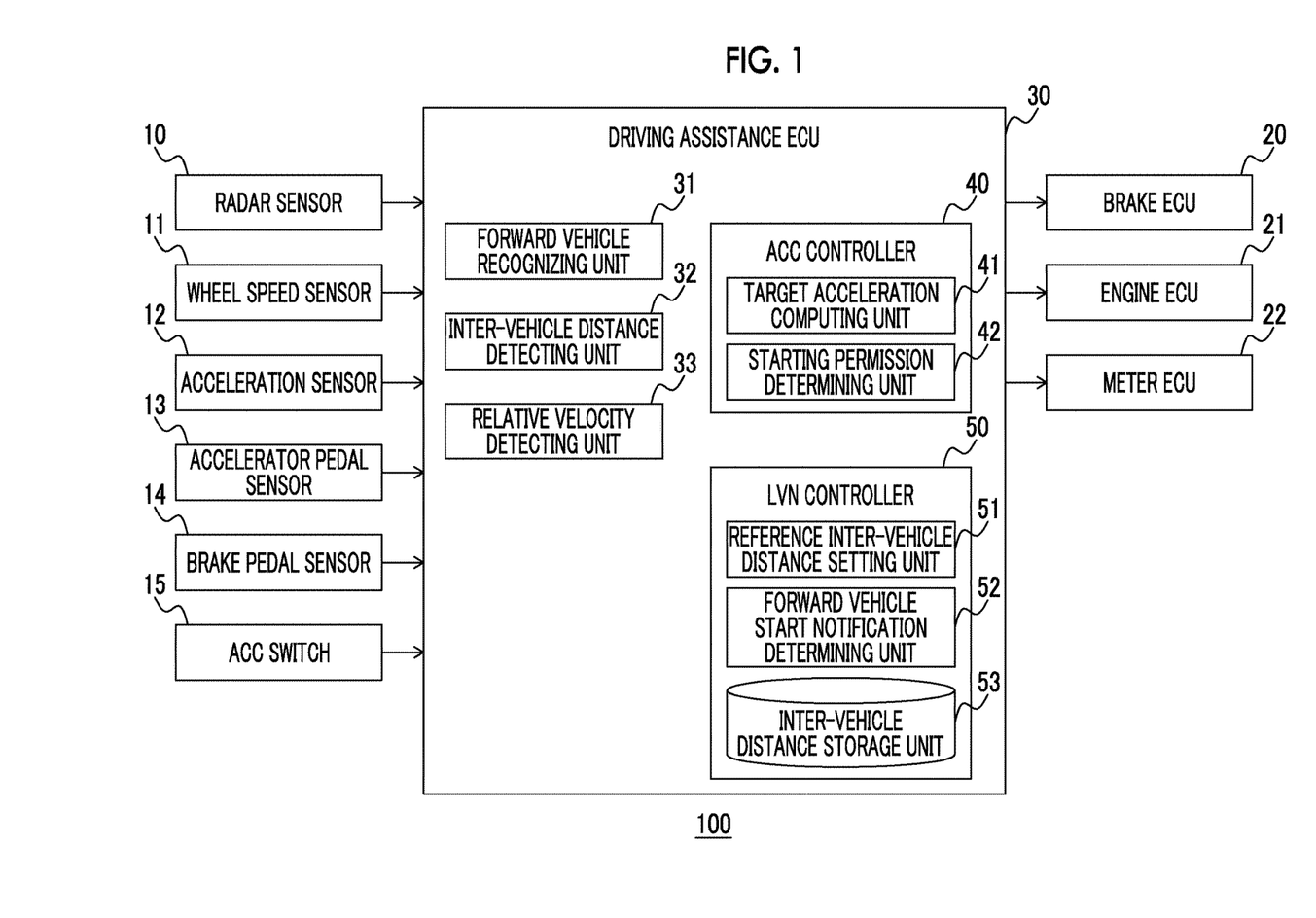
FIG. 1 is a functional block diagram of a driving assistance system according to one embodiment of the present disclosure.

FIG. 1 is a functional block diagram of a driving assistance system 100 according to one embodiment of the present disclosure. The driving assistance system 100 includes a radar sensor 10, a wheel speed sensor 11, an acceleration sensor 12, an accelerator pedal sensor 13, a brake pedal sensor 14, an ACC switch 15, a brake ECU (Electronic Control Unit) 20, an engine ECU 21, a meter ECU 22, and a driving assistance ECU 30.

The radar sensor 10 is a radar for detecting an object, using millimeter waves. The radar sensor 10 is mounted on a front, central portion of a subject vehicle in which the driving assistance system 100 is installed. The radar sensor 10 obtains radar-wave information concerning an object or objects within a search region that extends over a given angle about a center position at which the radar sensor 10 is mounted on the subject vehicle. The radar sensor 10 sends the obtained radar-wave information to the driving assistance ECU 30.

The wheel speed sensor 11 obtains the speed of the subject vehicle. The acceleration sensor 12 obtains the acceleration of the subject vehicle. The accelerator pedal sensor 13 obtains the stroke or operation amount of an accelerator pedal. The brake pedal sensor 14 obtains the amount of depression of a brake pedal. The wheel speed sensor 11, acceleration sensor 12, accelerator pedal sensor 13, and the brake pedal sensor 14 send the obtained speed of the subject vehicle, acceleration information, accelerator pedal stroke information, and the amount of depression, respectively, to the driving assistance ECU 30, at intervals of a given period (e.g., at intervals of 0.5 sec.).

The ACC switch 15 is a switch for carrying out operations, such as ON (activation)/OFF (stop) of full speed range ACC, and setting of a target speed. The ACC switch 15 sends information on operation performed by the driver, to the driving assistance ECU 30.

Each of the brake ECU 20, engine ECU 21, meter ECU 22, and the driving assistance ECU 30 is an electronic control unit consisting of CPU, ROM, RAM, etc., and repeatedly executes its processing at given intervals.

The brake ECU 20 controls each brake, and eventually controls braking force. The brake ECU 20 determines the wheel cylinder pressure of the brake, based on information on the amount of depression of the brake pedal, information on the speed of the subject vehicle, and so forth, and sends a control signal to an electromagnetic valve of each wheel cylinder. Also, if the brake ECU 20 receives a brake control signal (which will be described later) from the driving assistance ECU 30, it determines the wheel cylinder pressure of each brake, based on a target deceleration indicated by the brake control signal, and sends a control signal to an electromagnetic valve of each wheel cylinder.

The engine ECU 21 controls the engine, and eventually controls driving force. The engine ECU 21 determines the opening of an electronically controlled throttle of the engine, based on accelerator pedal stroke information, subject vehicle speed information, and so forth, and sends a control signal to the electronically controlled throttle. Also, if the engine ECU 21 receives an engine control signal (which will be described later) from the driving assistance ECU 30, it determines the opening of the electronically controlled throttle of the engine, based on a target acceleration indicated by the engine control signal, and sends a control signal to the electronically controlled throttle.

The meter ECU 22 is a control device that controls a combination meter, and a notification sound generator. The combination meter includes various instruments, such as a speed meter, a tachometer, and a fuel gauge, various warning lamps, such as those for charge of a battery, half-shut door, fuel, and oil pressures, a display that displays various kinds of information, and so forth. The meter ECU 22 performs control of these various instruments, turning on/off of the warning lamps, and display control of the display, for example. The meter ECU 22 also performs output control of notification sound generated from the notification sound generator. In particular, when the meter ECU 22 receives a meter control signal that indicates permission of starting, from a starting permission determining unit 42 that will be described later, the meter ECU 22 causes the display of the combination meter to display a sign indicating permission of starting, and causes the notification sound generator to generate a specified notification sound. Also, when the meter ECU 22 receives a meter control signal indicating starting of a forward vehicle, from a forward vehicle start notification determining unit 52 that will be described later, the meter ECU 22 causes the display of the combination meter to display a sign indicating starting of the forward vehicle, and causes the notification sound generator to generate a specified notification sound.

The driving assistance ECU 30 performs driving assistance control according to the driving situation. The driving assistance ECU 30 includes a forward vehicle recognizing unit 31, an inter-vehicle distance detecting unit 32, a relative velocity detecting unit 33, an ACC controller 40, and an LVN controller 50.

The forward vehicle recognizing unit 31 determines whether there is a forward vehicle, based on radar-wave information from the radar sensor 10. When there is a forward vehicle, the inter-vehicle distance detecting unit 32 detects an inter-vehicle distance between the subject vehicle and the forward vehicle, based on the radar-wave information. The relative velocity detecting unit 33 detects a relative velocity between the subject vehicle and the forward vehicle, based on the radar-wave information. Each of the forward vehicle recognizing unit 31, inter-vehicle distance detecting unit 32, and the relative velocity detecting unit 33 executes its processing at intervals of a given period (e.g., at intervals of 0.1 sec.).

The ACC controller 40 performs full speed range ACC, namely, controls the inter-vehicle distance between the forward vehicle and the subject vehicle, over the full speed range. When an ON signal is sent from the ACC switch 15 to the ACC controller 40, the ACC controller 40 activates the full speed range ACC. When an OFF signal is sent from the ACC switch 15, the ACC controller 40 deactivates or stops the full speed range ACC. The ACC controller 40 includes a target acceleration computing unit 41, and a starting permission determining unit 42.

The target acceleration computing unit 41 calculates a target acceleration, based on the inter-vehicle distance between the forward vehicle and the subject vehicle, and the relative velocity. In particular, the target acceleration computing unit 41 calculates the target acceleration, so that the inter-vehicle distance between the forward vehicle and the subject vehicle becomes equal to a target inter-vehicle distance appropriate to the speed of the subject vehicle. The target acceleration may be a positive value that indicates acceleration, or a negative value that indicates deceleration. When the target acceleration is a positive value, the target acceleration computing unit 41 calculates control driving force from the target acceleration, and sends an engine control signal indicative of the control driving force (target driving force), to the engine ECU 21. Also, when the target acceleration is a negative value, the target acceleration computing unit 41 calculates control braking force from the target acceleration, and sends a brake control signal indicative of the control braking force (target braking force) to the brake ECU 20. The target acceleration may be calculated by a known method.

When the subject vehicle is automatically stopped in response to stop of the forward vehicle, the starting permission determining unit 42 determines whether to permit starting of the subject vehicle (which will be called "starting permission determination"), at intervals of a given period (e.g., at intervals of 0.1 sec.). More specifically, the starting permission determining unit 42 determines that the subject vehicle is permitted to start when either of the following conditions (1), (2) is satisfied. The condition (1) is that the speed of the forward vehicle is equal to or higher than a first speed (e.g., 2 km/h), and the inter-vehicle distance to the forward vehicle is equal to or larger than a first distance (e.g., 3 m). The condition (2) is that the inter-vehicle distance to the forward vehicle is equal to or larger than a second distance (e.g., 8 m) that is larger than the first distance.

When the starting permission determining unit 42 determines that the subject vehicle is permitted to start, it performs notifying operation to notify the driver of permission of starting. More specifically, the starting permission determining unit 42 performs the notifying operation, by sending a meter control signal indicating permission of starting to the meter ECU 22, so as to cause the meter ECU 22 to execute display of starting permission and output of notification sound. Accordingly, the conditions (1), (2) may also be called notification conditions based on which it is determined whether the ACC controller 40 performs notification regarding starting of the forward vehicle.

The LVN controller 50 performs a forward vehicle start notifying function of notifying the driver of the subject vehicle of starting of the forward vehicle, when the driver continues to stop the subject vehicle without noticing starting of the forward vehicle. The LVN controller 50 includes a reference inter-vehicle distance setting unit 51, forward vehicle start notification determining unit 52, and an inter-vehicle distance storage unit 53.

The reference inter-vehicle distance setting unit 51 sets an inter-vehicle distance used for starting notification determination that will be described later. More specifically, the reference inter-vehicle distance setting unit 51 stores the inter-vehicle distance used for starting notification determination, as the reference inter-vehicle distance, in the inter-vehicle distance storage unit 53.

When the full speed range ACC is in an inactive state, the reference inter-vehicle distance setting unit 51 sets the inter-vehicle distance between the forward vehicle and the subject vehicle when both of the forward vehicle and the subject vehicle are stopped as "reference inter-vehicle distance", and stores it in the inter-vehicle distance storage unit 53. On the other hand, when the full speed range ACC is in an active state, the reference inter-vehicle distance setting unit 51 sets the inter-vehicle distance between the forward vehicle and the subject vehicle when permission of starting is determined under the full speed range ACC, in other words, when a notification condition concerning notification by the ACC controller 40 is satisfied, as "reference inter-vehicle distance", and stores it in the inter-vehicle distance storage unit 53.

The forward vehicle start notification determining unit 52 determines whether to notify the driver of starting of the forward vehicle (which will be called "starting notification determination"), at intervals of a given period (e.g., at intervals of 0.1 sec.). When the inter-vehicle distance between the subject vehicle and the forward vehicle becomes larger than the reference inter-vehicle distance, by a third distance (e.g., 4 m) as a predetermined distance or larger, the forward vehicle start notification determining unit 52 determines that the driver is to be notified of starting of the forward vehicle.

When the forward vehicle start notification determining unit 52 determines that the driver is to be notified of starting of the forward vehicle, it performs notifying operation to notify the driver of starting of the forward vehicle. More specifically, the forward vehicle start notification determining unit 52 performs the notifying operation, by sending a meter control signal indicating starting of the forward vehicle, to the meter ECU 22, so as to cause the meter ECU 22 to provide display indicating starting of the forward vehicle and execute output of notification sound.

Figure 2A:
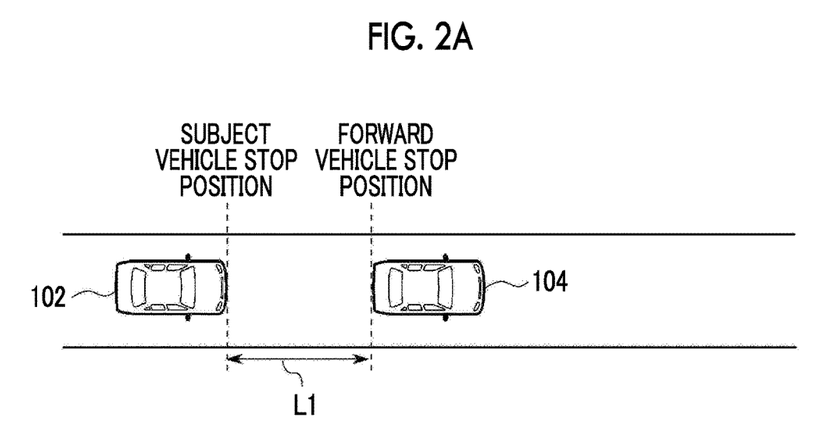
FIG. 2A is a schematic view useful for explaining operation of an LVN controller when full speed range ACC is in an inactive state.
Figure 2B:
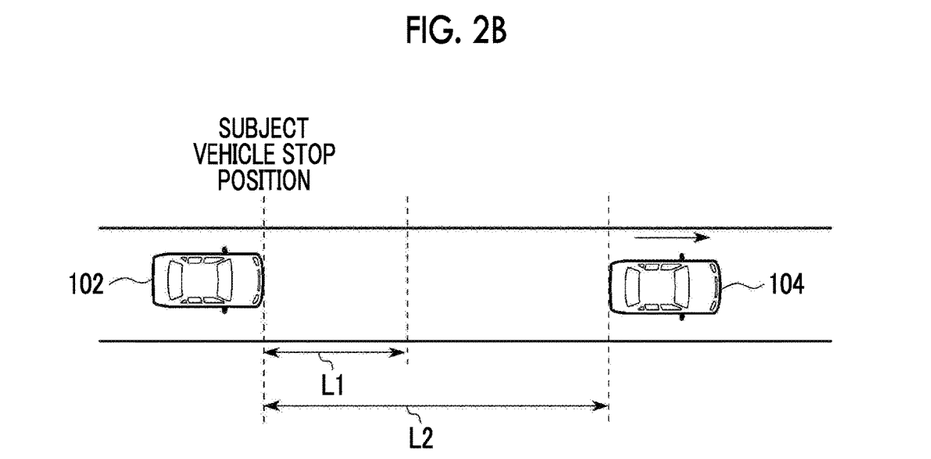
FIG. 2B is a schematic view useful for explaining operation of the LVN controller when the full speed range ACC is in the inactive state.

The operation of the LVN controller 50 will be further described. FIG 2A and FIG. 2B are schematic views useful for explaining operation of the LVN controller 50 when the full speed range ACC is in the inactive state.

FIG. 2A shows a condition where both of the forward vehicle 104 and the subject vehicle 102 are stopped, and the inter-vehicle distance between the forward vehicle 104 and the subject vehicle 102 is equal to L1. In this case, the reference inter-vehicle distance setting unit 51 stores L1 as the reference inter-vehicle distance in the inter-vehicle distance storage unit 53.

FIG. 2B shows a condition where the forward vehicle 104 starts, and the inter-vehicle distance between the forward vehicle 104 and the subject vehicle 102 becomes equal to L2. If the inter-vehicle distance between the forward vehicle 104 and the subject vehicle 102 becomes larger than the reference inter-vehicle distance, by the third distance or larger, namely, if L2−L1≥the third distance is satisfied, the forward vehicle start notification determining unit 52 determines that the driver is to be notified of starting of the forward vehicle.

Figure 3A:
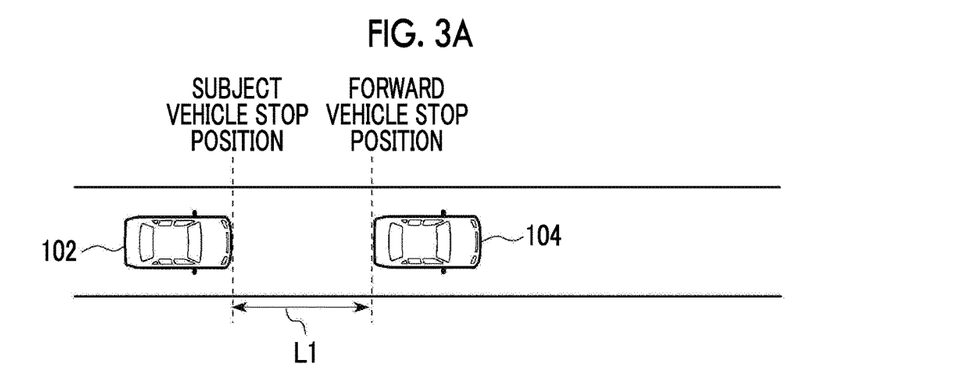
FIG. 3A is a schematic view useful for explaining operation of the LVN controller when the full speed range ACC is in an active state.
Figure 3B:
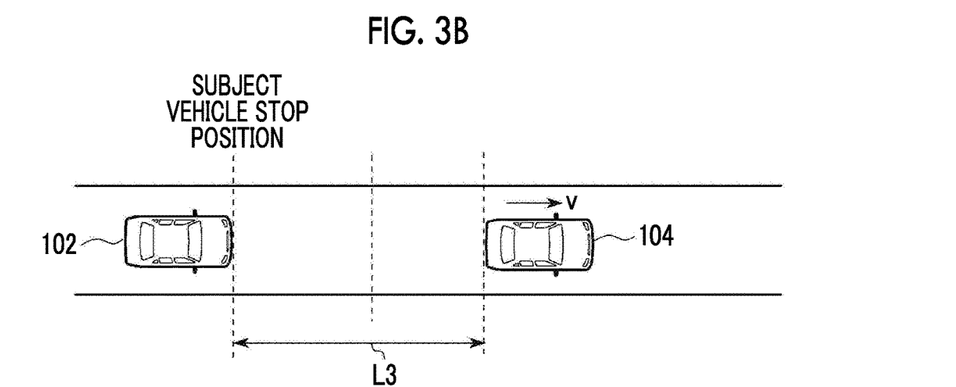
FIG. 3B is a schematic view useful for explaining operation of the LVN controller when the full speed range ACC is in the active state.
Figure 3C:
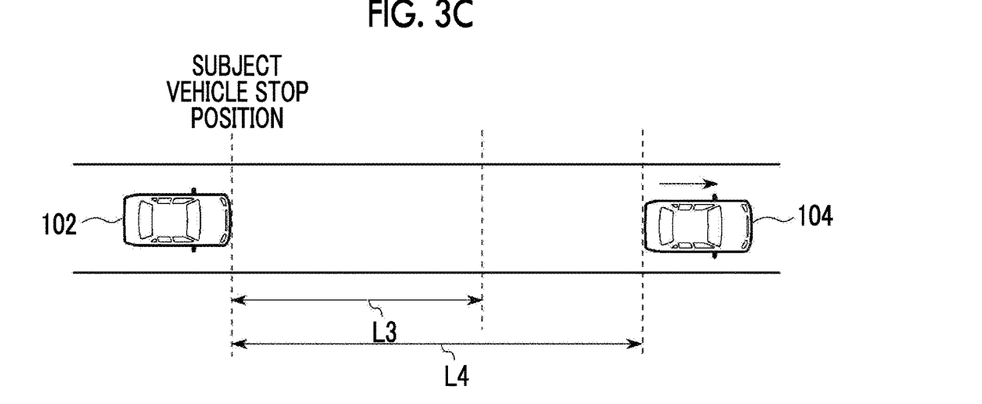
FIG. 3C is a schematic view useful for explaining operation of the LVN controller when the full speed range ACC is in the active state.

FIG. 3A through FIG. 3C are schematic views useful for explaining the operation of the LVN controller 50 when the full speed range ACC is in the active state.

FIG. 3A shows a condition where both of the forward vehicle 104 and the subject vehicle 102 are stopped, and the inter-vehicle distance between the forward vehicle 104 and the subject vehicle 102 is equal to L1. FIG. 3A corresponds to FIG. 2A. FIG. 3B shows a condition where the forward vehicle 104 starts, and travels at a speed v, and the inter-vehicle distance between the forward vehicle 104 and the subject vehicle 102 becomes equal to L3, which is a condition where the condition of notification by the ACC controller 40 is satisfied. Namely, FIG. 3B shows the case where v≥the first speed, and L3≥the first distance, or the case where L3≥the second distance. In these cases, the reference inter-vehicle distance setting unit 51 stores L3 as "reference inter-vehicle distance" in the inter-vehicle distance storage unit 53.

FIG. 3C shows a condition where the forward vehicle 104 further proceeds, from the condition of FIG. 3B, and the inter-vehicle distance between the forward vehicle 104 and the subject vehicle 102 becomes equal to L4. The forward vehicle start notification determining unit 52 determines that it notifies the driver of starting of the forward vehicle when the inter-vehicle distance between the forward vehicle 104 and the subject vehicle 102 becomes larger than the reference inter-vehicle distance, by the third distance or larger, namely, when L4−L3≥the third distance is satisfied.

Figure 4:
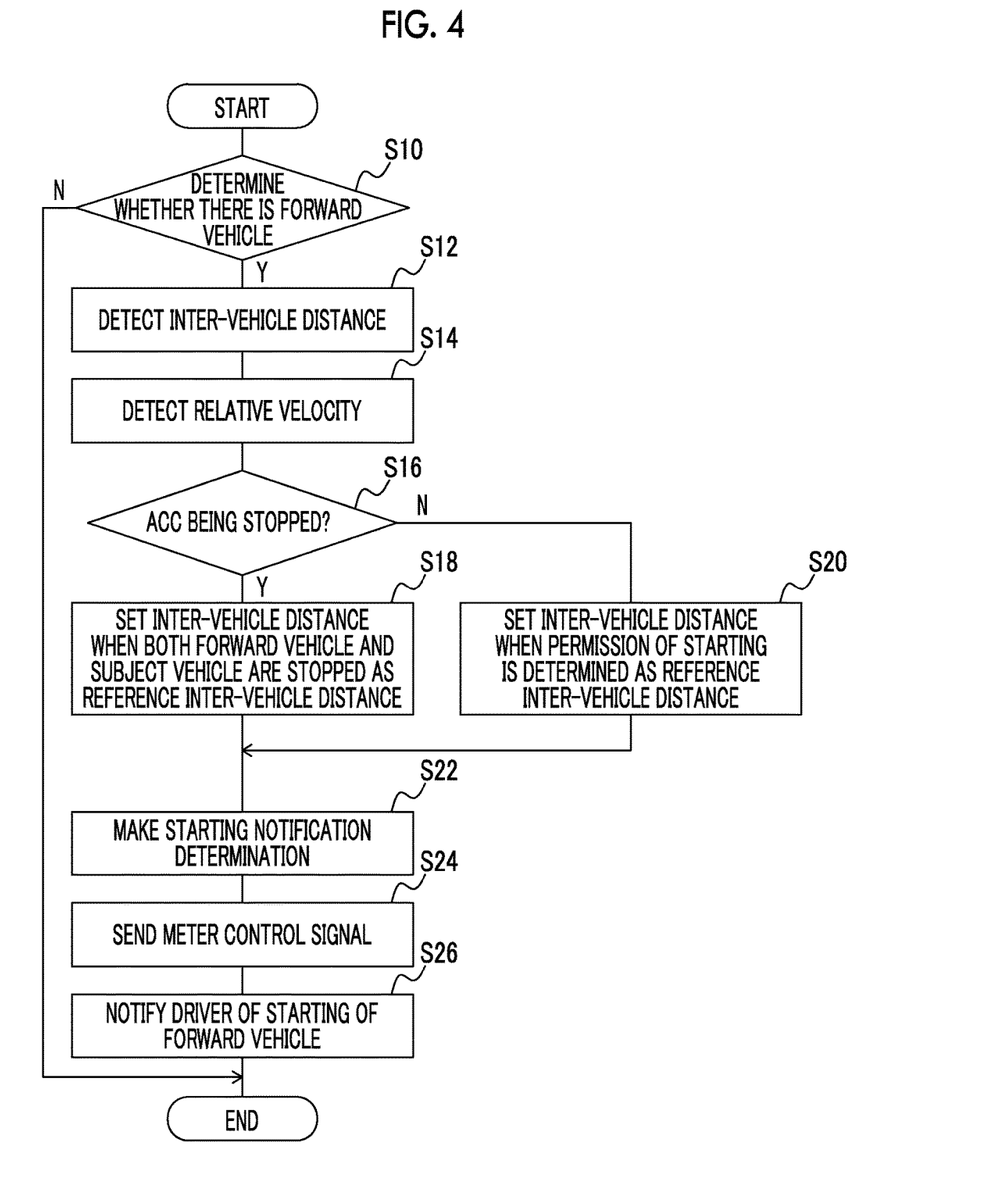
FIG. 4 is a flowchart illustrating operation of forward vehicle start notification.

The operation of the forward vehicle start notification function performed by the driving assistance system 100 configured as described above will be described. FIG. 4 is a flowchart illustrating the operation of the forward vehicle start notification function. When the forward vehicle recognizing unit 31 determines that the subject vehicle is stopped, it determines whether there is a forward vehicle (S10). The forward vehicle recognizing unit 31 determines that the subject vehicle is stopped, when the speed of the subject vehicle obtained by the wheel speed sensor 11 is kept equal to 0 km/h for a given period of time. If there is no forward vehicle (NO in S10), the current cycle of the routine illustrated in FIG. 4 ends. If there is a forward vehicle (YES in S10), the inter-vehicle distance detecting unit 32 detects the inter-vehicle distance between the subject vehicle and the forward vehicle, at intervals of a given period (S12). Also, the relative velocity detecting unit 33 detects the relative velocity between the subject vehicle and the forward vehicle at intervals of a given period (S14).

When the full speed range ACC is in the inactive state (YES in S16), the reference inter-vehicle distance setting unit 51 sets the inter-vehicle distance (L1, in the case of FIG. 2A) between the forward vehicle and the subject vehicle when both of the forward vehicle and the subject vehicle are stopped, as the reference inter-vehicle distance, and stores it in the inter-vehicle distance storage unit 53 (S18). On the other hand, when the full speed range ACC is in the active state (NO in S16), the reference inter-vehicle distance setting unit 51 sets the inter-vehicle distance (L3, in the case of FIG. 3B) between the forward vehicle and the subject vehicle when the full speed range ACC determines that the subject vehicle is permitted to be started (when a notification condition as to whether notification by the ACC controller 40 is made is satisfied), as the reference inter-vehicle distance, and stores it in the inter-vehicle distance storage unit 53 (S20).

The forward vehicle start notification determining unit 52 makes a starting notification determination at intervals of a given period (S22). The forward vehicle start notification determining unit 52 determines that the driver is to be notified of starting of the forward vehicle, if the inter-vehicle distance between the forward vehicle and the subject vehicle becomes larger than the reference inter-vehicle distance, by the third distance or larger, and sends a meter control signal indicating this determination to the meter ECU 22 (S24). The meter ECU 22 notifies the driver of starting of the forward vehicle, based on the meter control signal (S26).

With the driving assistance system 100 configured according to the above-described embodiment, while the full speed range ACC is in the active state, the inter-vehicle distance detected when the full speed range ACC determines permission of starting (when the notification condition as to whether notification is made by the ACC controller 40 is satisfied) is set as the reference inter-vehicle distance for LVN. Accordingly, when notification under the full speed range ACC and notification under the LVN control are made, notification under the LVN control is always made after notification under the full speed range ACC is made. Namely, notification under the full speed range ACC and notification under the LVN control are not made at substantially the same time, but are made in the predetermined order. Accordingly, notification that would annoy or disturb the driver can be deterred.

The present disclosure has been described based on its embodiment. It is to be understood by those skilled in the art that the embodiment is merely exemplary, various modified examples can be provided by combining the constituent elements or control routines or steps in various manners, and that these modified examples are also within the scope of the present disclosure.

Modified Example 1

In the illustrated embodiment, the LVN is activated even while the full speed range ACC is in the active state. In this modified example, the LVN controller 50 does not perform forward vehicle start notification while the full speed range ACC is in the active state. More specifically, while the full speed range ACC is in the active state, the reference inter-vehicle distance setting unit 51 and the forward vehicle start notification determining unit 52 do not perform their operations. In this modified example, only the notification by the full speed range ACC is made when the forward vehicle starts; therefore, notification that would annoy or disturb the driver can be deterred.

Modified Example 2

In the illustrated embodiment, the inter-vehicle distance between the forward vehicle and the subject vehicle when the full speed range ACC determines permission of starting, in other words, when the notification condition as to whether notification by the ACC controller 40 is made is satisfied, is stored, as the reference inter-vehicle distance, in the inter-vehicle distance storage unit 53. However, the present disclosure is not limited to this arrangement. The inter-vehicle distance between the forward vehicle and the subject vehicle not only at the time when the full speed range ACC determines permission of starting (when the notification condition as to whether notification by the ACC controller 40 is made is satisfied), but also at a point in time after this determination is made, may be stored as the reference inter-vehicle distance in the inter-vehicle distance storage unit 53. For example, the inter-vehicle distance between the forward vehicle and the subject vehicle at the time when notification by the ACC controller 40 is made after the full speed range ACC determines permission of starting, or at a point in time immediately after the notification is made, may be stored as the reference inter-vehicle distance in the inter-vehicle distance storage unit 53.

What is claimed is:

1. A driving assistance system comprising:
   at least one electronic control unit configured to:
      detect an inter-vehicle distance between a forward vehicle and a subject vehicle;
      detect a relative velocity between the forward vehicle and the subject vehicle;
      control the subject vehicle such that the inter-vehicle distance becomes equal to a target inter-vehicle distance;
      determine that a notification condition is satisfied, when an inter-vehicle distance between a stopped subject vehicle and the forward vehicle becomes equal to or larger than a predetermined first distance and the relative velocity becomes equal to or higher than a predetermined first velocity, or the inter-vehicle distance between the stopped subject vehicle and the forward vehicle becomes equal to or larger than a predetermined second distance, the predetermined second distance being larger than the predetermined first distance, and
      perform a first notification operation on a driver when the notification condition is satisfied,
      set an inter-vehicle distance in a condition where both of the forward vehicle and the subject vehicle are stopped, as a reference inter-vehicle distance, and
      perform a second notification operation on the driver, when a difference between the reference inter-vehicle distance and the inter-vehicle distance, becomes equal to or larger than a predetermined third distance;
   a notifying unit configured to perform notification on the driver when receiving a signal from the at least one electronic control unit; wherein the at least one electronic control unit is configured not to perform the second notification operation on the driver, at least until after the first notification operation is performed, when the subject vehicle is controlled such that the inter-vehicle distance becomes equal to the target inter-vehicle distance.

2. The driving assistance system according to claim 1, wherein
   the at least one electronic control unit is configured to set the inter-vehicle distance at a given point in time upon or after a time at which it is determined that the notification condition is satisfied, as the reference inter-vehicle distance, when the subject vehicle is controlled such that the inter-vehicle distance becomes the target inter-vehicle distance.

3. The driving assistance system according to claim 2, wherein
   the at least one electronic control unit is configured to set the inter-vehicle distance at the time when it is determined that the notification condition is satisfied as the reference inter-vehicle distance, when the subject vehicle is controlled such that the inter-vehicle distance becomes the target inter-vehicle distance.

4. The driving assistance system according to claim 2, wherein
   the at least one electronic control unit is configured to set the inter-vehicle distance at a time when the first notification operation is executed, as the reference inter-vehicle distance, when the subject vehicle is controlled such that the inter-vehicle distance becomes the target inter-vehicle distance.

5. The driving assistance system according to claim 1, wherein
   the at least one electronic control unit is configured not to perform the second notification operation on the driver, when the subject vehicle is controlled such that the inter-vehicle distance becomes the target inter-vehicle distance.

6. The driving assistance system according to claim 1, wherein the at least one electronic control unit is configured to perform the first notification operation on the driver, when the inter-vehicle distance between the stopped subject vehicle and the forward vehicle becomes equal to or larger than the predetermined first distance, and the relative velocity becomes equal to or higher than the predetermined first velocity, or when the inter-vehicle distance between the stopped subject vehicle and the forward vehicle becomes equal to or larger than the predetermined second distance, when the subject vehicle is stopped in response to stop of the forward vehicle.

\* \* \* \* \*